(12) United States Patent
Lai et al.

(10) Patent No.: US 7,597,983 B2
(45) Date of Patent: Oct. 6, 2009

(54) EDGE STRESS RELIEF IN DIFFUSION MEDIA

(75) Inventors: Yeh-Hung Lai, Webster, NY (US);
Jeffrey A Rock, Fairport, NY (US);
Bhaskar Sompalli, Rochester, NY (US);
Robert Milgate, Gloucester, MA (US)

(73) Assignee: GM Global Technology Operations, Inc., Detroit, MI (US)

( * ) Notice: Subject to any disclaimer, the term of this patent is extended or adjusted under 35 U.S.C. 154(b) by 933 days.

(21) Appl. No.: 10/925,754

(22) Filed: Aug. 25, 2004

(65) Prior Publication Data
US 2006/0046124 A1    Mar. 2, 2006

(51) Int. Cl.
*H01M 2/00* (2006.01)
*H01M 2/08* (2006.01)

(52) U.S. Cl. .............................. 429/34; 429/35; 429/36
(58) Field of Classification Search ........................ None
See application file for complete search history.

(56) References Cited

U.S. PATENT DOCUMENTS

| | | | |
|---|---|---|---|
| 3,134,697 A | 5/1964 | Niedrach | |
| 5,272,017 A | 12/1993 | Swathirajan et al. | |
| 5,464,700 A | 11/1995 | Steck et al. | |
| 6,020,083 A | 2/2000 | Breault et al. | |
| 6,099,984 A | 8/2000 | Rock | |
| 6,127,058 A | 10/2000 | Pratt et al. | |
| 6,234,225 B1 | 5/2001 | Tanaka et al. | |
| 6,350,538 B1 | 2/2002 | Wilkinson et al. | |
| 6,641,862 B1 | 11/2003 | Grot | 427/115 |
| 2003/0049518 A1 | 3/2003 | Nanaumi et al. | |
| 2003/0118889 A1* | 6/2003 | Smith | 429/36 |
| 2004/0131908 A1 | 7/2004 | Tanaka | 429/30 |
| 2004/0151969 A1* | 8/2004 | Ian Joos et al. | 429/35 |

FOREIGN PATENT DOCUMENTS

WO     WO/00/10216     2/2000

OTHER PUBLICATIONS

International Search Report Issued by the ISA/US Dated Mar. 19, 2004.
International Search Report dated Jul. 6, 2006 for Appln. No. PCT/US05/20161 filed Jun. 9, 2005 corresponding to this application.

* cited by examiner

*Primary Examiner*—Dah-Wei D Yuan
*Assistant Examiner*—Kwang Han
(74) *Attorney, Agent, or Firm*—Harness, Dickey & Pierce, P.L.C.

(57) ABSTRACT

A diffusion media for use in a PEM fuel cell which includes a relieved edge region relative to the interior region of the diffusion media. The outer perimeter or portion of the diffusion media that will interface with a sealing gasket is pre-compressed. The pre-compressed diffusion media lowers the compression stress on the MEA at the gasket interfaces, enabling a more uniform compression on the entirety of the MEA surfaces during the build, compression, and later operation of a fuel cell stack.

21 Claims, 4 Drawing Sheets

EDGE STRESS RELIEF IN DIFFUSION MEDIA

FIELD OF THE INVENTION

The present invention relates to PEM fuel cells, and more particularly to a diffusion media for a fuel cell.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on the active area portion of one face and the cathode catalyst on the active area portion of the opposite face. The MEA is sandwiched between a pair of non-porous, electrically conductive elements or bipolar plates which serve as current collectors for the anode and cathode, and contain appropriate channels and/or openings formed therein for distributing the fuel cell's gaseous reactants over the surfaces of the respective anode and cathode catalysts.

The electrically conductive bipolar plates sandwiching the MEAs may contain an array of grooves in the faces thereof that define a reactant flow field for distributing the fuel cell's gaseous reactant's (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

The portions of MEA faces beyond the active area are typically used as seal surfaces. On these edges of the membrane electrolyte, main gaskets or seals are disposed to peripherally frame the bipolar plates, preventing the membrane electrolyte from contacting the plates. Additional thin polymeric film gaskets have also been used between the membrane electrolyte and the diffusion media of the fuel cell. Due to significantly higher compression and shear stresses on the membrane electrolyte at the gasket interfaces during the stack build process, the sensitive membrane may fail prematurely. Thus there is a need for improved manufacture of these elements.

SUMMARY OF THE INVENTION

The present invention provides a diffusion media for use in a PEM fuel cell which includes a relieved edge region relative to the interior region of the diffusion media. Prior to the build and compression of a fuel cell stack, the outer perimeter or portion of the diffusion media that will interface with a sealing gasket is pre-compressed with a press tool. The pre-compressed diffusion media lowers the compression stress on the MEA at the gasket interface, enabling a more uniform compression over the entirety of the MEA surfaces during the build, compression, and later operation of a fuel cell stack.

In one aspect of the present invention, a fuel cell diffusion media is disclosed, including a first portion having a first thickness, and a second portion having a second thickness, wherein the first thickness is less than the second thickness. The first portion is adapted to engage with a gasket that provides a separation layer between the first portion and a membrane electrode assembly when compressed in a fuel cell.

In another aspect of the present invention, a fuel cell is disclosed. The fuel cell includes a separator plate, an MEA, and a diffusion media interposed between the separator plate and MEA. The diffusion media has a major face with an interior region and an exterior region. The major face is juxtaposed with a first reactant face of the MEA and defines a first interface between a diffusion media edge region spaced apart from an MEA edge region. A gasket is interposed between the MEA edge region and the diffusion media edge region to define a second interface therebetween. The gasket cooperates with the diffusion media edge region such that a compression pressure measured at the first interface is greater than, or equal to, two thirds of a compression pressure measured at the second interface when the MEA and gasket are compressed between the separator plate and the diffusion media.

In a further aspect of the present invention, a method of manufacturing a subassembly for a fuel cell is disclosed. The subassembly includes a diffusion media and a gasket, the gasket being operable to form a separation layer between the diffusion media and an MEA. The method includes: (1) applying a force to a portion of the diffusion media thereby compressing and permanently deforming said portion of the diffusion media; (2) removing said force from said portion of the diffusion media; and (3) attaching the gasket to the diffusion media.

In still another aspect of the present invention, a method of making a fuel cell stack that includes a plurality of fuel cells stacked one upon another and compressed together is disclosed. The fuel cells include a diffusion media, an MEA, a gasket operable to provide a separation layer between the edges of the diffusion media and the MEA, and a conductive electrode element. The method includes: (1) applying a compressive force to a portion of the diffusion media prior to the diffusion media being compressed with the compression of the fuel cells in the fuel cell stack; (2) removing the compressive force; (3) arranging the fuel cells in a desired orientation; and (4) compressing the fuel cells together to form the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
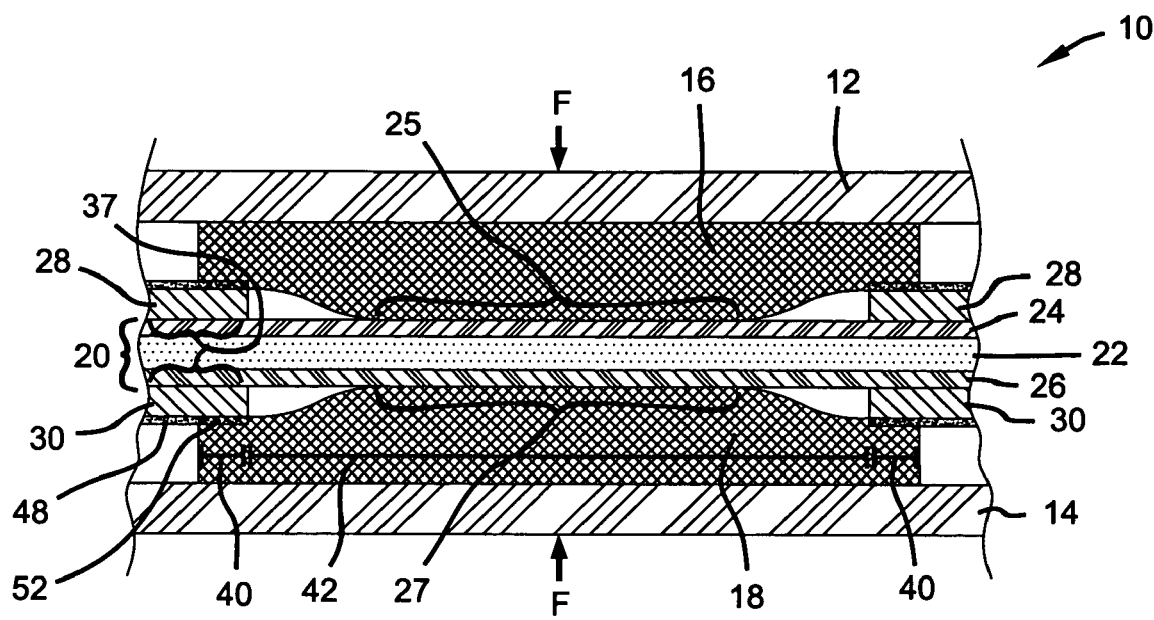
FIG. 1A is a partial cross sectional view of a fuel cell assembly according to the principles of the present invention.

The following description of the preferred embodiment(s) is merely exemplary in nature and is in no way intended to limit the invention, its application, or uses.

Fuel cell stacks typically comprise a plurality of fuel cells stacked one upon another and held in compression with respect to each other. The plurality of stacked fuel cells forms a fuel cell assembly which is compressed to hold the plurality of fuel cells in a compressive relation. FIG. 4 illustrates a partial cross-sectional view of a prior art fuel cell arrangement 110 including a first bipolar plate 112 and a second bipolar plate 114. Bipolar plates 112, 114 are also referred to herein as electrically conductive electrodes. A diffusion media 116, 118 is adjacent to each bipolar plate 112, 114, respectively. An MEA 120 is disposed between the diffusion media 116, 118. The MEA 120 includes an ionically conductive member 122 with an anode electrode 124 on one face and a cathode electrode 126 on a second opposite face. At the edges of the MEA 120, a first gasket layer 128 and a second gasket layer 130 are disposed, preventing any bare MEA 120 from being exposed to the bipolar plates 112, 114 and the harsh fuel cell environment. The fuel cell assembly requires a significant amount of compressive force to squeeze the fuel cells of the stack together. The need for compressive force arises from the internal gas pressure of the reactants within the fuel cells, in addition to the need to maintain good electrical contacts between the internal components of the fuel cells. Preferably, the active areas of the fuel cells are uniformly compressed to maximize the efficiency of the fuel cell stack assembly.

The prior art assembly 110 with gaskets 128, 130 as shown in FIG. 4, typically induces significantly higher compression and shear stresses in the MEA 120 at the gasket edges 132, 134 during the stack build and compression process. This results, in part, because portions of the diffusion media 136, 138 above and under the gaskets 128, 130, respectively, have to be compressed more to accommodate the additional thickness of the gaskets 128, 130.

Figure 4A:
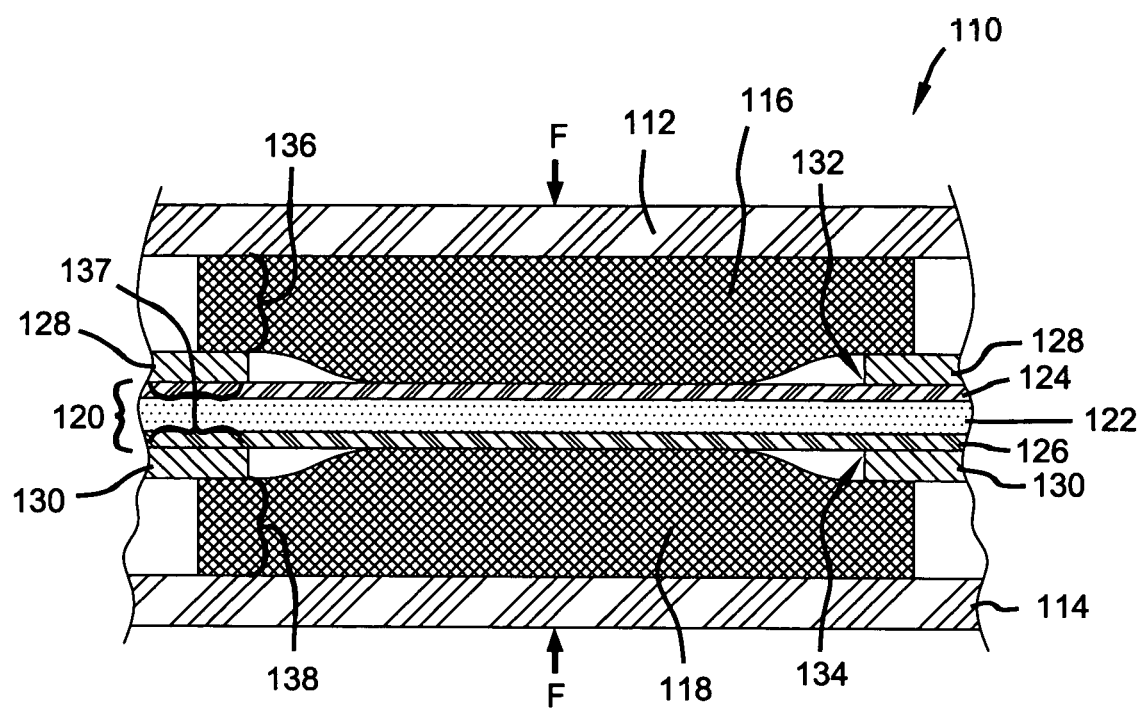
FIG. 4A is a partial cross sectional view of a prior art fuel cell assembly.
Figure 4B:
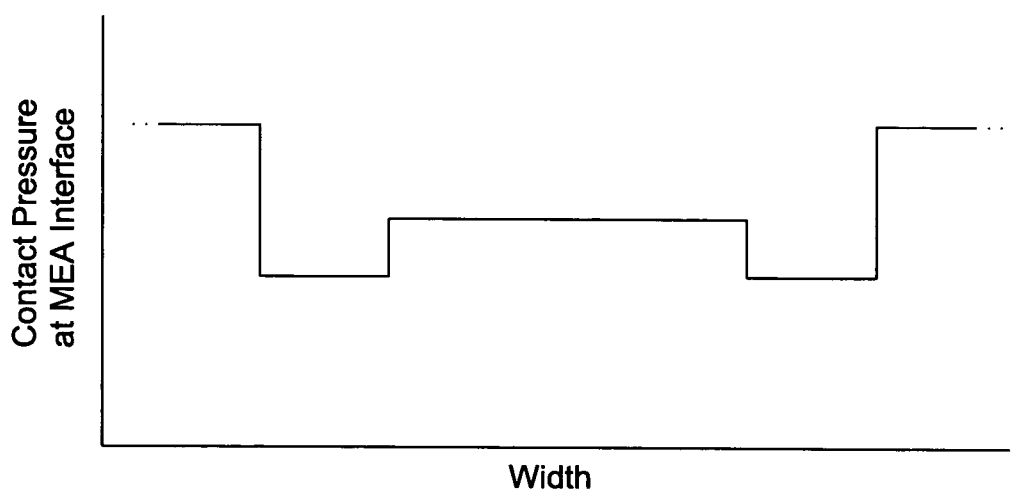
FIG. 4B is a graph of contact pressure along the width of the MEA/diffusion media interface of a prior art fuel cell assembly.

FIG. 4B illustrates the pressure distribution or contact pressure across the width of an MEA of a prior art fuel cell assembly corresponding to FIG. 4A. Using a typical gasket made of a polymeric film with a thickness of 0.025 mm and a typical Toray® paper with a thickness of 0.2 mm as the diffusion media 116, 118, it has been established that the MEA pressure at the gasket edge interface areas 137 can be up to twice that of the active areas 125, 127 after the build and compression of a fuel cell stack assembly. As a result, it has been found that the MEA 120 tends to fail prematurely at the gasket edges 132, 134 of the MEA 120, which may seriously degrade the durability of the fuel cell stack.

The present invention addresses the high compression stress issue with a design and method of using a diffusion media that includes a relieved edge region relative to the interior region of the diffusion media. The relieved edge region has different stress-strain properties in the thickness direction which imparts stress relief to the edge region. In a preferred embodiment, the diffusion media is pre-compressed at the perimeter prior to being used in a fuel cell. The pre-compressed diffusion media lowers the compression stress at the MEA-gasket interfaces and increases the MEA durability.

FIG. 1A is a partial cross-sectional view of a fuel cell 10 having a membrane electrode assembly (MEA) according to the present invention. As shown in FIG. 1A, the MEA 20 includes an ionically conductive member 22 sandwiched by an anode electrode 24 and a cathode electrode 26 that provide a pair of active surfaces 25, 27. The MEA 20 is further sandwiched by a pair of diffusion media 16, 18. Before the fuel cell assembly, the diffusion media 16, 18 are each pre-compressed in an area along the outer perimeter, adjacent to the gaskets 28, 30 that peripherally surrounds the diffusion media 16, 18. An additional seal member (not shown) is disposed in the perimeter regions between the bipolar plates 12, 14. As is known in the art, the bipolar plates 12, 14 each include a reactant flow field (not shown) generally characterized by a plurality of lands that define a plurality of flow channels through which the reactants flow. The gaskets 28, 30 and sealing members are typically elastomeric in nature but may also comprise materials such as polyester and polytetrafluoroethylene (PTFE). However, the gaskets and sealing members may be any material sufficient for sealing the MEA 20.

The ionically conductive member 22 is preferably a thin solid polymer membrane electrolyte, and preferably a PEM. Member 22 is also referred to herein as a membrane 22. Preferably, the ionically conductive member 22 has a thickness in the range of about 10 μm-100 μm, and most preferably a thickness of about 25 μm. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 22 may comprise any of the proton conductive polymers conventionally used in the art. Preferably, perfluorinated sulfonic acid polymers such as commercially available NAFION® are used. Furthermore, the polymer may be the sole constituent of the membrane, contain mechanically supporting fibrils of another material, or be interspersed with particles (e.g., with silica, zeolites, or other similar particles). Alternatively, the polymer or ionomer may be carried in the pores of another material.

The ionically conductive member 22 is a cation permeable, proton conductive membrane, having $H^+$ ions as the mobile ion; the fuel gas is hydrogen (or reformate) and the oxidant is oxygen or air. The overall cell reaction is the oxidation of hydrogen to water and the respective reactions at the anode and cathode are $H_2 = 2H^+ + 2e^-$ (anode) and $\frac{1}{2}O_2 + 2H^+ + 2e^- = H_2O$ (cathode).

The composition of the anode electrode 24 and cathode electrode 26 preferably comprises electrochemically active material dispersed in a polymer binder which, like the ionically conductive member 22, is a proton conductive material such as NAFION®. The electrochemically active material preferably comprises catalyst-coated carbon or graphite particles. The anode electrode 24 and cathode electrode 26 will preferably include platinum-ruthenium, platinum, or other Pt/transition-metal-alloys as the catalyst. Although the anode 24 and cathode 26 in the figures are shown to be equal in size, it should be noted that it is not out of the scope of the invention for the anode 24 and cathode 26 to be of different size (i.e., the cathode larger than the anode or vice versa). A preferred thickness of the anode and cathode is in the range of about 2-30 μm, and most preferably about 10 μm. In an alternate embodiment, the fuel cell can use a catalyst coated diffusion media. In this design, the MEA solely consists of the ionically conductive member 22 wherein the electrodes and electrochemically active material is incorporated within the diffusion media 16, 18 (not shown).

It should be understood that the anode electrode 24 and cathode electrode 26 are disposed over the ionically conductive member 22 as continuous, smooth layers which provides an essentially flat surface for the gaskets 28, 30 and diffusion media 16, 18 to rest upon. This is beneficial in that when these elements are compressed along with the MEA 20 in a fuel cell stack assembly in order to facilitate and enhance the electrical conductivity of the electrons produced in the electrochemical reaction of the fuel cell, the ionically conductive member 22 will generally be subject to a uniform pressure across and throughout its surfaces. When the ionically conductive member is subjected to uniform pressures throughout its surfaces, undue stress on the ionically conductive member 22 will be decreased or eliminated. It should also be understood that although FIG. 1A illustrates the anode 24 and cathode 26 being disposed over the entire area of the ionically conductive member 22, the anode 24 and cathode 26 layers may not necessarily extend to the outermost edges of the MEA 20.

The diffusion media 16, 18 may generally be any diffusion media known in the art. Preferably, the diffusion media 16, 18 are carbon papers, carbon cloths, or carbon foams with a thickness in the range of about 50-500 µm. Diffusion media 16, 18 assist in dispersing reactant gases over the electrodes 24, 26 and conduct current from the electrodes 24, 26 to the lands (not shown) of the electrically conductive bipolar plates 12, 14. A preferred diffusion media of the present invention includes a first portion 40 having a first thickness, and a second portion 42, adjacent the active area of the MEA 25, 27, having a second and greater thickness. The first portion 40 is permanently deformed and adapted to engage with a gasket 28, 30 that provides a separation layer between the first portion 40 and the MEA 20 when compressed in a fuel cell assembly. The gasket 28, 30 serves to secure the edge area of the fuel cell. It allows heat transfer from the active area of the fuel cell to the outer perimeter and prevents any fibers of the diffusion media 16, 18 from having direct contact with any bare membrane.

Figure 1B:
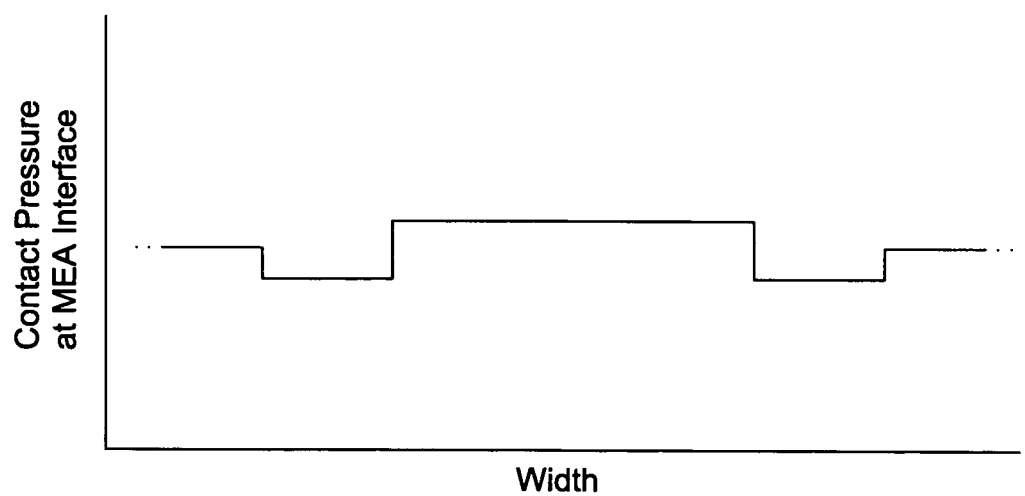
FIG. 1B is a graph of contact pressure along the width of the MEA/diffusion media interface of a fuel cell assembly according to the principles of the present invention.
Figure 2:
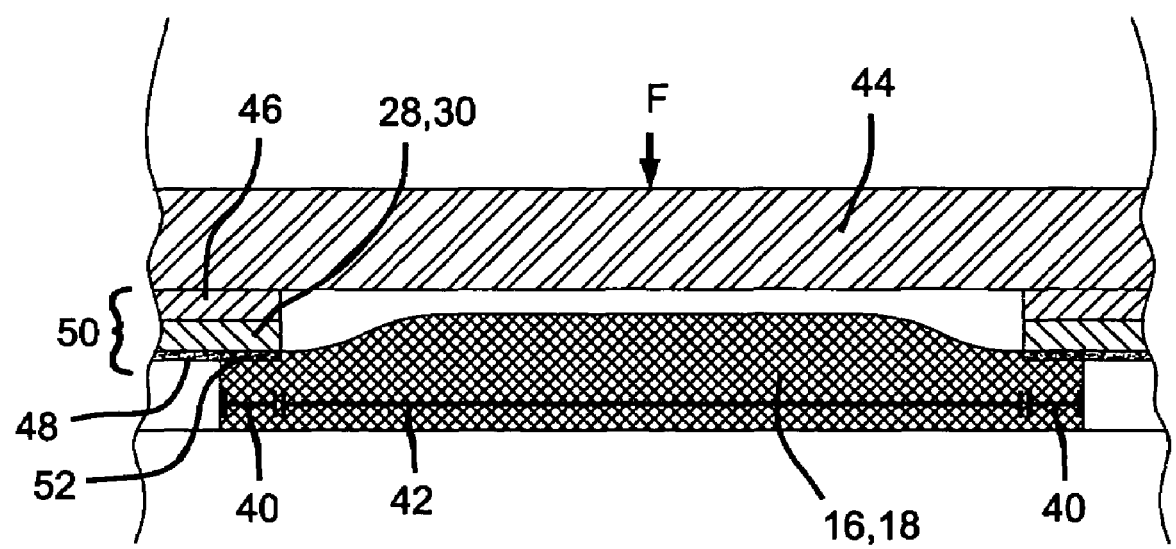
FIG. 2 is a cross sectional view of a press tool compressing a diffusion media according to the principles of the present invention.

As previously stated, in order to facilitate electrical conductivity between the diffusion media 16, 18 and electrodes 24, 26, the MEA 20 needs to be compressed at a high pressure. Preferably, the first thickness is of a magnitude that results in a compressive pressure at the interfaces 37 of the MEA 20 and gaskets 28, 30 within a predetermined range for the particular fuel cell stack assembly. In one embodiment, as depicted in FIGS. 1A and 1B, the compressive pressure at the interfaces 37 is less than or equal to the compressive pressure at the active areas 25, 27 between the MEA 20 and the diffusion media 16, 18. In order to obtain this result, the gaskets 28, 30 preferably have a thickness such that the thickness of the second portion 42 is greater than the total thickness of the gasket 28, 30 and the first portion 40 of the diffusion media 16, 18. The thickness of the second portion 42 may be up to 1.2 times greater than the thickness of the first portion 40 (up to 120%). It should be understood that a definitive sloping or gradient variance of the thickness between the deformed first portion 40 and non-deformed second portion 42 may not necessarily exist as shown in FIGS. 1-3. More particularly, it should be understood that if a gradient variance does exist between such portions, the figures do not necessarily represent the correct scale of the variation.

The pre-compression pressure will depend on the thickness of the gaskets 28, 30, the targeted stack compression, and the compressive behavior of the diffusion media 16, 18. The compressive behavior of the diffusion media 16, 18 can be described by its compression stress/strain curve which is generated by a series of loading, unloading, and reloading cycles, wherein subsequent cycles experience higher compressive pressure. The magnitude of the compressive force used to pre-compress the diffusion media 16, 18 should be selected so that the perimeter or edges 40 of the diffusion media 16, 18 in the subsequent manufacturing process can be reloaded up to a first desired pressure so that the active area 25, 27 of the MEA 20 is compressed to a second desired pressure. In one embodiment, the first desired pressure is less than, or equal to, 150% of the second desired pressure over the MEA in the active area 25, 27.

A method for manufacturing a pre-compressed diffusion media of the present invention is illustrated in FIG. 2. In one preferred embodiment, a press tool 44 compresses the edges 40 of the diffusion media to a pre-determined compressive force. The gasket 28, 30 is provided with a removable backing 46 on a first side, and a layer of pressure sensitive adhesive (PSA) 48 on a second opposite side. Preferably, the removable backing 46 is laminated to the gasket, and the PSA 48 is applied to the opposite side. This can be performed on an individual basis, or alternatively, a PSA/gasket/backing sub-assembly 50 can be prepared in sheet form (not shown) and later cut or formed into desired shapes and sizes according to the gasket used. Once the PSA/gasket/backing sub-assembly 50 is created, it is placed on the diffusion media 16, 18 and light pressure is applied to fix the sub-assembly 50 in place. A press tool 44 is then aligned and placed on top of the sub-assembly 50 and a pre-determined compressive force is applied to the sub-assembly 50 and the underlying diffusion media 16, 18. Upon the application of pressure, the diffusion media is permanently deformed at the edges 40. The PSA 48 adheres the gasket 28, 30 to the diffusion media 16, 18 by dispersing into the areas 52 of the diffusion media 16, 18 which contact the gasket 28, 30. Preferably, the thickness of the removable backing 46 is selected so that the press tool 44 does not physically contact the non-compressed active area 42 of the diffusion media during the compression.

PSA's are generally supplied as a coating on a substrate, and are supported by various carriers such as paper, cloth, cellulose, plastic films, metal foil. Chemical families of PSA's include natural rubber, styrene-butadiene rubber, butyl rubber, reclaimed rubber, nitrile rubber, polyacrylates, polyvinylethers, and silicones. Generally, pure rubber-based materials have poor aging characteristics. Most are based on rubbers with various additives, including tackifiers. PSA is easy to apply, yet adhesive performance is intricately influenced by application equipment. Generally, PSA labels and tapes have uniform thickness, and adhesion normally becomes permanent at room temperature (i.e., no activation is required by heat, water, or solvents), although cross-linking of some formulations is possible. Preferably, the selected PSA is capable of holding substrates together when they are brought into contact under brief pressure at room temperature. The PSA material must possess the capability to dissipate energy during adhesion, have partial elastic behavior, and have the tendency to resist excessive flow, that is, the ability to store bond rupture energy to provide peel and tack (i.e., viscoelasticity). Silicone PSA's have a wider temperature use range than most others and have excellent chemical and solvent resistance and flexibility. Silicone PSA's are based on a gum and resin.

In an alternate embodiment of the present invention, the diffusion media 16, 18 can be compressed without the simultaneous bonding or attachment of the gasket 28, 30. This embodiment includes applying a force to a portion of the diffusion media, thereby compressing and permanently deforming a portion of the diffusion media. Preferably the outer perimeter portion of the diffusion media is compressed. The diffusion media can be compressed using a press tool 44, as previously described, that is altered to have a protruding shape of the gasket. Another embodiment includes pressing the diffusion media through a frame-type apparatus that is contoured to have the shape of the gasket 28, 30. It should be understood that the present invention is not to be limited by the disclosed embodiments in which the diffusion media is pre-compressed, and numerous variations and methods of compressing portions of the diffusion media can be used by one skilled in the art.

Figure 3A:
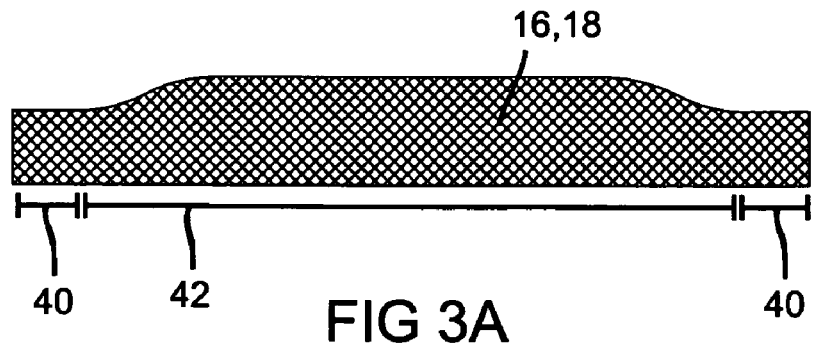
FIGS. 3A-3D are cross sectional views of preferred configurations of the present invention.
Figure 3B:
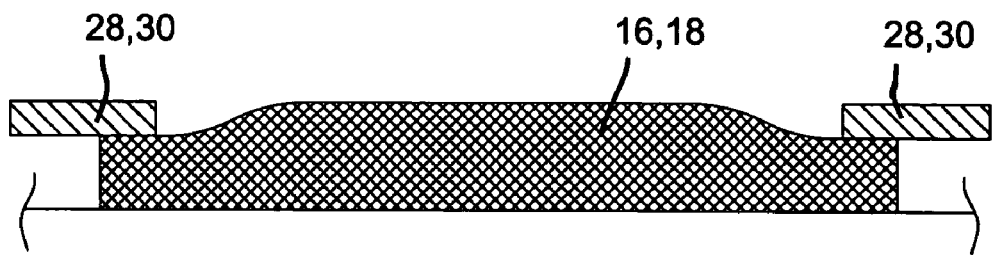
Figure 3C:
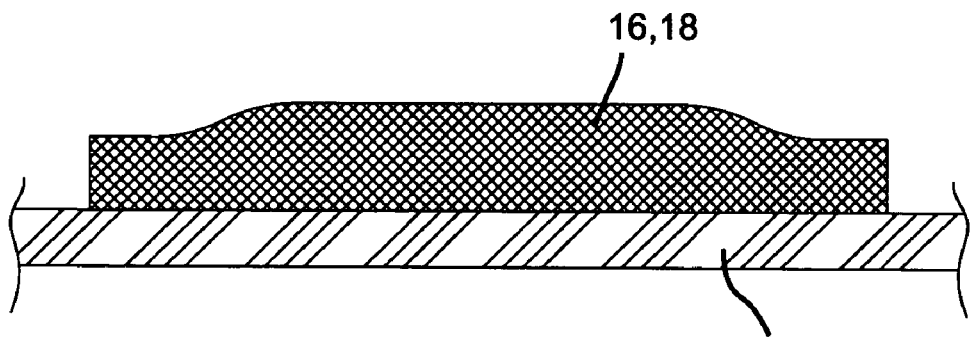
Figure 3D:
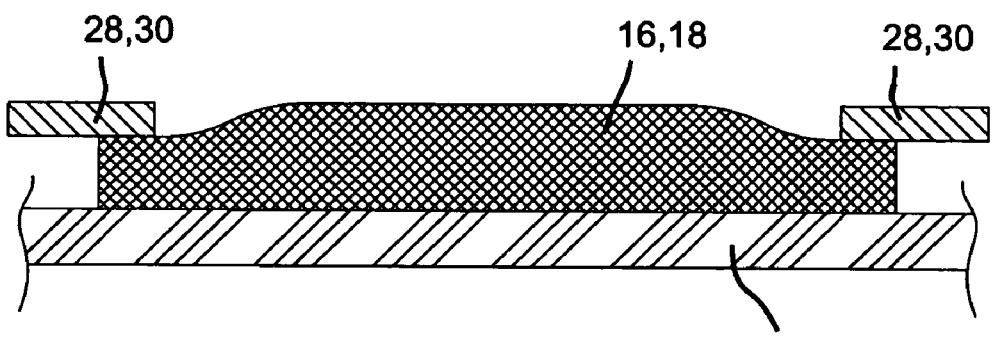

FIGS. 3A-3D illustrate various embodiments and sub-assemblies of the present invention. FIG. 3A depicts the pre-compressed diffusion media 16, 18 itself as a unitary embodiment. In another embodiment, the gasket 28, 30 can be bonded to the diffusion media 16, 18, to form an assembly as shown in FIG. 3B. In a preferred embodiment, the gasket 28, 30 is attached to the diffusion media 16, 18 and only overlaps the diffusion media 16, 18 along the pre-compressed portion 40 of the diffusion media 16, 18. FIGS. 3C and 3D represent the diffusion media and diffusion media/gasket sub-assembly attached to either side of a bipolar plate 12, 14. Preferably, the diffusion media 16, 18 is bonded to the bipolar plate 12, 14 with an electrically conductive adhesive. The adhesive may be applied between the two surfaces along the outer perimeter, or may be applied to the lands of the bipolar plate 12, 14 prior to assembly with the diffusion media 16, 18. Suitable conductive adhesives may contain a variety of materials, including flake and powdered metal, and are generally known in the art. Conductive adhesives are preferred over soldering methods since a conductive adhesive will generally have greater resistance against corrosion and aggressive materials in harsh environments such as fuel cells. Additionally, compared to solder, an adhesive reduces the weight for the connecting materials by a factor of 10 to 20.

A method for preparing a fuel cell stack that includes arranging a plurality of fuel cells one upon another and compressing the assembly will now be described. Each fuel cell includes diffusion media 16, 18, an MEA 20, gaskets 28, 30 operable to provide a separation layerl between the diffusion media 16, 18 and the MEA 20, and a pair of conductive electrode elements 12, 14. The method includes applying and removing a compressive force to permanently deform a portion of the diffusion media, as previously described. The pre-compressed diffusion media 16, 18 is arranged with the other fuel cell components into a desired formation, and the entire assembly of elements is compressed together, forming a fuel cell stack. The compressive force imparted on the fuel cell assembly can typically be generated by upper and lower end plates (not shown) being held in a fixed spaced relation by side plates (not shown) as is known in the art. One skilled in the art will recognize that the number of fuel cells that are stacked adjacent one another to form the fuel cell assembly can vary, and will depend upon the needs of the fuel cell stack.

It should be appreciated that while the present invention discloses preferred embodiments including diffusion media 16, 18 that have pre-compressed edges, alternate methods of relieving stress on the MEA at the MEA/gasket interfaces may be contemplated. For example, the edges of the diffusion media may be cut out or removed by other means, including but not limited to laser etching, chemical etching, engraving, grinding, milling, shaping, sanding, and other similar mechanical type processes known in the art to shape and deform a solid member. Thus, the description of the invention is merely exemplary in nature and variations that do not depart from the gist of the invention are intended to be within the scope of the invention. Such variations are not to be regarded as a departure from the spirit and scope of the invention.

What is claimed is:

1. A fuel cell diffusion media comprising:
a first portion having a first thickness;
a gasket including an adhesive layer securing the gasket to the first portion having a gasket thickness; and
a second portion having a second thickness that is greater than a combined thickness of said first thickness and said gasket thickness,
wherein said gasket provides a separation layer between said first portion and a membrane electrode assembly when compressed in a fuel cell.

2. The diffusion media of claim 1, wherein said first thickness is of a magnitude that results in a compressive pressure at an interface of said first portion and said gasket within a fuel cell stack being in a predetermined range.

3. The diffusion media of claim 2, wherein said compressive pressure at said interface is less than a compressive pressure between said second portion and said membrane electrode assembly.

4. The diffusion media of claim 1, wherein said first portion includes a perimeter of the diffusion media.

5. The diffusion media of claim 1, wherein said first portion is a permanently deformed portion.

6. A fuel cell comprising:
a separator plate;
a membrane electrode assembly having an MEA edge region, an MEA interior region adjacent said MEA edge region, and a first reactant surface formed on a face of said MEA interior region;
a diffusion media interposed between said separator plate and said membrane electrode assembly, said diffusion media having a major face formed on a diffusion media interior region and juxtaposed with said first reactant face to define a first interface therebetween and a diffusion media edge region spaced apart from said MEA edge region; and
a gasket interposed between said MEA edge region and said diffusion media edge region to define a second interface, said second interface having an adhesive layer securing said gasket and said diffusion media edge region,
wherein said gasket cooperates with said diffusion media edge region such that a resulting compression pressure measured at said first interface is greater than a resulting compression pressure measured at said second interface when a pressure is applied to said fuel cell such that said diffusion media and said gasket are compressed between said separator plate and said membrane electrode assembly.

7. The fuel cell of claim 6 wherein said diffusion media interior region has a first thickness and said diffusion media edge region has a second thickness which is less than said first thickness.

8. The fuel cell of claim 7 wherein said diffusion media further comprises a compressed diffusion media edge region.

9. The fuel cell of claim 7 wherein said gasket has a first gasket thickness, wherein said first thickness is up to 1.2 times greater than a sum of said second and first gasket thickness.

10. The fuel cell of claim 6 wherein said diffusion media edge region extends around the perimeter of said diffusion media.

11. The fuel cell of claim 6 wherein said adhesive layer comprises a layer of pressure sensitive adhesive.

12. The fuel cell of claim 6 wherein said gasket extends laterally outward from said MEA edge region.

13. The fuel cell of claim 6 further comprising:

a second reactant surface formed on a face of said MEA interior region opposite said first reactant surface;

a second separator plate;

a second diffusion media interposed between said second separator plate and said membrane electrode assembly, said second diffusion media having a major face formed on a second diffusion media interior region and juxtaposed with said second reactant face to define a third interface therebetween and a second diffusion media edge region spaced apart from said MEA edge region; and a second gasket interposed between said MEA edge region and said second diffusion media edge region to define a fourth interface between said gasket and said diffusion media edge region, wherein said second gasket cooperates with said second diffusion media edge region such that a resulting compression pressure measured at said third interface is greater than a resulting compression pressure measured at said fourth interface when a pressure is applied to said fuel cell such that said diffusion media and said second gasket are compressed between said second separator plate and said diffusion media.

14. The fuel cell of claim 13 wherein said second diffusion media interior region has a third thickness and said second diffusion media edge region has a fourth thickness which is less than said third thickness.

15. The fuel cell of claim 14 wherein said second diffusion media further comprises a compressed diffusion media edge region.

16. The fuel cell of claim 14 wherein said second gasket has a second gasket thickness, wherein said third thickness is up to 1.2 times greater than a sum of said fourth and second gasket thickness.

17. The fuel cell of claim 13 wherein said second diffusion media edge region extends around the perimeter of said second diffusion media.

18. The fuel cell of claim 13 wherein said second gasket is adhesively secured to said MEA edge region.

19. The fuel cell of claim 13 wherein said second gasket extend laterally outward from said MEA edge region.

20. The diffusion media of claim 1 wherein said adhesive layer comprises a layer of pressure sensitive adhesive.

21. The fuel cell of claim 18 wherein said second gasket is adhesively secured to said MEA edge region with a layer of pressure sensitive adhesive.

* * * * *